United States Patent [19]

Glaspie

[11] 4,086,307

[45] Apr. 25, 1978

[54] TOWER PACKING SADDLE

[75] Inventor: Donald L. Glaspie, Dallas, Tex.

[73] Assignee: Glitsch, Inc., Dallas, Tex.

[21] Appl. No.: 815,739

[22] Filed: Jul. 14, 1977

Related U.S. Application Data

[63] Continuation of Ser. No. 691,127, May 28, 1976, abandoned, which is a continuation of Ser. No. 485,408, Jul. 3, 1974, abandoned.

[51] Int. Cl.² ............................................. B01F 3/04
[52] U.S. Cl. ..................................... 261/97; 210/150; 261/DIG. 72
[58] Field of Search .................................. 261/94–98, 261/112, DIG. 72; 210/150, 151; 264/285, 296, 280

[56] References Cited

U.S. PATENT DOCUMENTS

| 1,796,501 | 3/1931 | Berl | 261/94 |
|---|---|---|---|
| 1,947,777 | 2/1934 | Huff et al. | 261/94 |
| 2,212,932 | 8/1940 | Fairlie | 261/94 |
| 2,591,497 | 4/1952 | Berl | 210/150 X |
| 2,602,651 | 7/1952 | Cannon | 261/95 |
| 2,639,909 | 5/1953 | Leva | 261/95 |
| 2,734,245 | 2/1956 | Chamberlain | 264/280 X |
| 3,167,600 | 1/1965 | Worman | 261/94 |
| 3,232,589 | 2/1966 | Eckert | 261/95 |
| 3,484,513 | 12/1969 | Paoli | 264/285 X |
| 3,506,248 | 4/1970 | Starbuck et al. | 261/94 |
| 3,618,910 | 11/1971 | Arndt | 261/94 |
| 3,752,453 | 8/1973 | Doyne | 261/94 |
| 3,796,657 | 3/1974 | Pretorius et al. | 261/94 X |
| 3,914,351 | 10/1975 | McKeown et al. | 261/98 |
| 3,956,128 | 5/1976 | Turner | 210/150 |
| 3,957,931 | 5/1976 | Ellis et al. | 261/98 |

FOREIGN PATENT DOCUMENTS

| 768,316 | 2/1957 | United Kingdom | 261/94 |
|---|---|---|---|
| 917,906 | 2/1963 | United Kingdom | 261/94 |

OTHER PUBLICATIONS

Norton, Intalox Tower Packing, pp. 1, 2, 6–9, Copyright 1973, Norton Co., Akron, Ohio, Bulletin SI-72.
Koch Engineering Co. Inc., Flexisaddles, Bulletin FS-1, received Aug. 21, 1975.

Primary Examiner—Tim R. Miles
Assistant Examiner—Richard L. Chiesa
Attorney, Agent, or Firm—Marvin A. Naigur; John E. Wilson; John J. Herguth, Jr.

[57] ABSTRACT

There has been provided an improved saddle for use as a packing or contacting element formed into a shape resembling an inner peripheral half section of a hollow torus having respective edges in generally parallel planes relative to a transverse axis of the torus and in generally the same plane as the cross-sectional axis of the torus, each edge having a plurality of integral protrusions forming points extending a selected distance from the surface adjacent the respective edge for providing drip points for liquids and spacing of the element one from the other such that there can be substantially no pooling of liquids regardless of how the saddles are disposed adjacent one another in the tower.

6 Claims, 8 Drawing Figures

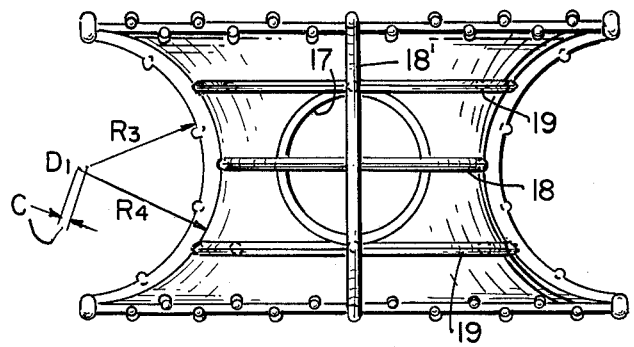
FIG. 3
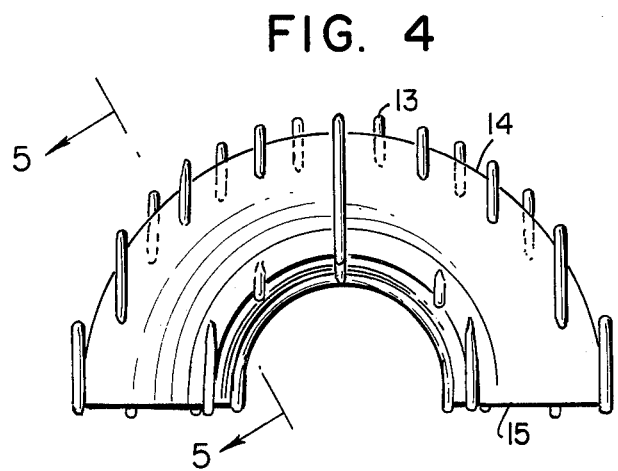
FIG. 4
FIG. 5
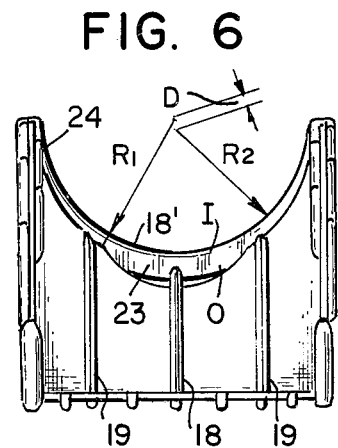
FIG. 6
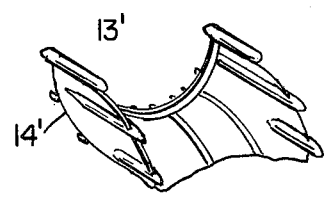
FIG. 7

TOWER PACKING SADDLE

This is a continuation of application Ser. No. 691,127, filed May 28, 1976 which was a continuation of U.S. Ser. No. 485,408 filed July 3, 1974, both now abandoned.

BACKGROUND OF THE INVENTION

The invention herein relates to improved packing saddle for use in gas and liquid contact apparatus. Saddles of the type described herein have been in use in the past. However, the design of these devices have sometimes hindered their effective application in treating towers due to the problems associated with the settling of the packing bed and inordinate amounts of liquids trapped in the tower due to pooling or damming of liquid compositions therein.

One of the problems associated with saddles of the type described above is that they tend to engage with one another in such a way that the effective surface area thereof is reduced because certain surfaces of one saddle engage with another so as to eliminate any effective contact of liquids and vapors passing in countercurrent through the saddle bed. Another problem which has arisen is that the beds after a period of use tend to settle. The effective surface area for the entire bed may be reduced substantially, the pressure drop may increase beyond acceptable limits, and the settled bed may provide dams for chemicals and/or liquids to pool or well such that the effective counterflow of the liquids and vapors within the bed is reduced substantially.

The present invention contemplates a design in which not only is the settling problem virtually eliminated but the pooling or welling of any liquid is made virtually impossible due to the effective separation provided by the design of the saddle. Further, the number of saddles required per cubic foot may be greatly reduced over conventional saddles due in part to the improved separation between saddles and the greater rigidity provided by the design as described below. Excessive settling, having been eliminated, the effect of the surface area provided is stablized at that which is calculated for a particular volume of saddles in the tower. In this regard, since the saddles are always separated from one another and won't settle beyond a predictable and acceptable limit, the pressure drop is rendered stable and remains substantially less than that with the saddles of the prior art which tend to become tightly compacted.

It is therefore an object of the present invention to provide a tower packing saddle which is economical to manufacture and will provide sufficient separation from other adjacent packing saddles to eliminate the aforementioned problems.

It is another object of the present invention to provide a tower packing saddle forming a stable bed when deposited in a treatment tower.

It is another object of the present invention to provide a tower packing saddle providing effective fluid and vapor contacting surface without excessive pressure drop within the tower.

It is still another object of the present invention to provide a tower packing saddle which is not susceptible to collapsing or flattening such that the packing bed will remain relatively stable in volume and effective surface area for fluid/vapor contacting.

SUMMARY OF THE INVENTION

There has been provided an improved saddle for use in a contacting apparatus as a packing or contacting element formed into a shape resembling an inner peripheral half section of a hollow torus, having respective edges in generally parallel planes relative to a transverse axis of the torus and edges in generally the same plane as the cross-sectional axis of the torus, each edge having a plurality of integral protrusions forming the points extending a selected distance from the surface adjacent the respective edge for providing drip points for liquids in contact with the packing material and for separating one packing element from another such that there can be substantially no pooling of liquids regardless of how the saddles are disposed adjacent one another in the tower.

For a better understanding of the present invention together with other and further objects thereof, reference is directed to the following description taken in connection with the accompanying drawings, while its scope will be pointed out in the appended claims.

DESCRIPTION OF THE DRAWINGS

FIG. 3 is a top view of the saddle shown in FIG. 2;

FIG. 4 is a side view of the saddle shown in FIG. 2;

FIG. 5 is a sectional view of the saddle taken along the line 5—5 of FIG. 4;

FIG. 6 is an end view of the saddle shown in FIG. 2; and

FIG. 7 is a perspective view showing a fragment of another embodiment of the saddle of the present invention illustrating drip points extending from both sides of the surfaces adjacent a marginal edge;

DESCRIPTION OF THE PREFERRED EMBODIMENT

Figure 1:
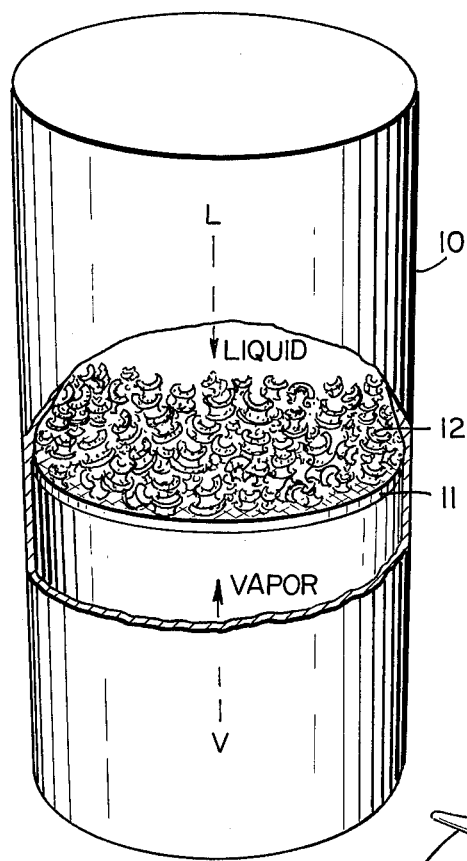
FIG. 1 shows a schematic drawing of a chemical treatment tower with a section removed showing the disposition of a bed of tower packing elements of the kind contemplated in the present invention.

FIG. 1 generally shows a chemical treatment tower 10 into which liquids L and vapors V are conducted in counterflow with each other. The tower 10 has a section removed to illustrate the general operation of the saddles described herein and there is shown a supporting device or tray 11 into which a great plurality of the saddles designated generally as 12 are disposed. The saddles are deposited in the tray 11 randomly by merely dumping them in place and roughly leveling the distribution by any suitable method. The vapors V and liquids L flowing in counterflow with each other will mix in a manner contemplated by the utilization of the packing material and the particular chemical process involved. At any rate, liquids flow over the various surfaces of the packing saddle while the vapors engage with those surfaces in accordance with the particular process.

Figure 2:
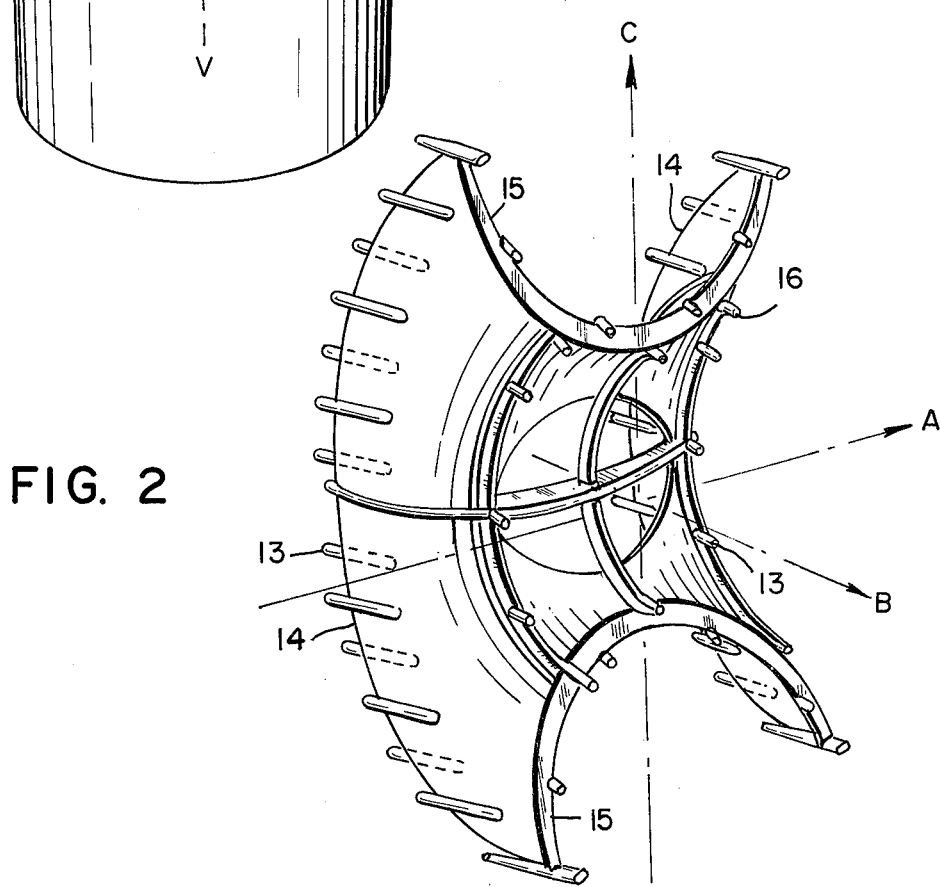
FIG. 2 is a perspective view of a tower packing saddle of the kind contemplated in the present invention.

In FIG. 4, there is shown a side view of the saddle resembling a side view of a semi-circular element or semi-circular annulus. In reality, the general form of the saddle is shown in FIG. 2 and is an inner peripheral half section of a hollow torus having three axes, a symmetrical axis or central axis A, a transverse axis B and a cross-sectional axis C. These axes are perpendicular to one another and generally describe the geometric relationship of the torus with conventional descriptions.

The saddle 12 has a plurality of drip points 13 of a selected length extending simultaneously or alternately from edges 14 of the saddle. These edges 14 shown also in FIGS. 3, 4 and 5 are parallel with each other and are in planes substantially parallel to a transverse plane midway between them which includes transverse axis B. Another set of edges 15 are disposed in the same cross-sectional axis which includes the cross-sectional plane C of the torus. These edges 15 also have drip points 16 of a selected length which may be different from the length of the drip points 13 described above. The points 13 and 16 are evenly disposed along their respective edges 14 and 15 and the sides of the points 13 and 14 project outwardly beyond the inner and outer side edges thereof. It should be understood that variations of spacing of the points is possible and probable if required for different applications.

FIGS. 3 and 4 show the saddle with alternating points 13, however it is clear from the description that points 13 may be disposed so as to extend from both sides of edge 14 simultaneously. FIG. 7 shows this variation in a fragmentary illustration with edge 14' and points 13'.

The saddle 12 has a hole 17 having cross members 18 and 18' forming ribs of the saddle. These cross members strengthen and give rigidity to the saddle as well as provide drip points at their extreme ends shown more clearly in FIG. 4 and in cross-section in FIG. 5. Other ribs 19 are also included but do not cross the opening of the hole 17. The hole prevents any pooling or collection of chemical materials should the saddle be disposed on some odd position. Further, the hole 17 provides a passage for vapor flow which decreases pressure drops across the bed.

It should be noted that the rib 18' in the hole is not of constant thickness across its length. This prevents the tight engagement of two saddles and associated collection of fluids adjacent surfaces which might be possible if two saddles engage one with the other. To illustrate, the rib 18' shown in FIG. 6 is of varied width since the outer edge O and the inner edge I engaging with the saddle itself having offset radii. The radii R1 and R2 are of different magnitude and are offset by the distance D, the edge 18' is wider towards its center 23 than at its ends 24. This prevents tight engagement with other similarly formed portions of other saddles so that pooling is virtually eliminated.

This principle is also illustrated in FIG. 3 wherein R3 and R4 are radii of the differing magnitude offset by distance D to form an edge 15.

Another means to prevent pooling is to extend drip points laterally beyond marginal edge portions 26 substantially so that as one saddle engages with another, similarly shaped surfaces will not engage flush with one another and therefore pooling will be virtually eliminated since the fluids will flow between the separating drip points which offset one surface from another. Each of the inner and outer surfaces of the saddle have been designed so as to provide this protection by placing drip points alternately on the surfaces.

It is essential to have the protection described above since the advantages of the invention herein are hinged upon the fact that pooling and pressure drops are reduced because the saddles do not settle and engage tightly with one another. The saddles herein will react as any other packing material and in time settle to some extent. However, the settling which occurs with the saddles of the present invention is reduced to an amount which is predictable and always maintains the surface area per cubic foot of packing material to within certain limits.

In devices of the prior art, when eventual settling occurred, it was possible to increase liquid entrapment; reduce substantially the surface area available for the counterflow of liquid and vapors; as well as increase the pressure drop through the bed. In the present invention, however, even if settling occurs, the drip points and extensions thereof both outwardly and inwardly of the edges prevent any surfaces from tightly engaging. This effectively provides a saddle which has a predictable surface area per unit volume and which will remain stable throughout its useful life.

It should be understood that the packing element of the present invention may be utilized in a great many processes. For example, differing combinations of liquid/vapor/solid contacting, sewage treatment beds, chemical treatment and heat exchange. Specific processes are evident from recitation of the foregoing and it should be understood that the processes are intended as exemplary recitations only.

Figure 8:
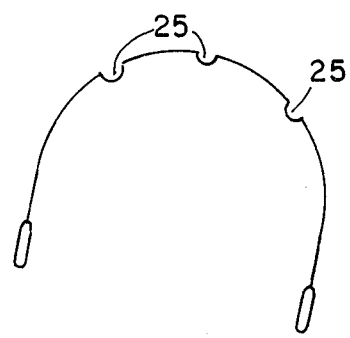
FIG. 8 is a view of another embodiment of the saddle of the present invention taken across a cross-sectional axis of the saddle illustrating the configuration of a die stamped element.

The packing elements of the present invention may be made of a variety of materials. In certain types of relatively low temperature operations, plastics of varying types may be used to fabricate the elements by injection molding. In high temperature operations, wherein a plastic might deform or melt, a molded metal could be utilized. This could be accomplished by a powder injection and sintering process. Other examples of possible processes could include stamping or die casting. Stamping would however change the cross-sectional configuration slightly as illustrated in FIG. 8. The saddle element illustrated in FIG. 8 has ribs 25 which are formed as depressions in the saddle. The ribs 25 shown in FIG. 8 provide strength and may be contrasted with the solid ribs 18 and 19 illustrated in FIG. 5, which, in the former case are formed with a set of pressing dies, and in the latter case are molded. The materials may range from plastic of a suitable material previously mentioned, to powdered material, metal in liquid and sheet form, ceramics and glass; the material and process being changed in accordance with the specific application for the saddle.

There has therefore been provided an improved saddle for use in chemical treatment towers having the shape of a section of a hollow torus with strengthening ribs and drip points therein for preventing engagement of one saddle element with another to thereby eliminate welling of chemical liquids and providing a stable and predictable pressure drop through the saddle material per unit volume.

While there has been described what at present is considered to be the preferred embodiment of the present invention, it will be obvious to those skilled in the art that various changes and modifications may be made therein without departing from the invention. It is intended in the appended claims to cover any such modifications and changes as fall within the true spirit of the scope of the invention.

What is claimed is:

1. An improved saddle packing element having a general shape that is a segment of an inner portion of a hollow torus having at each of its ends a generally arcuate end edge face, said faces lying in a cross-sectional plane including a cross-sectional axis, parallel and coplanar marginal edges at the periphery of arcuate marginal edge portions lying in generally parallel planes relative to a transverse plane including a transverse axis of said body, a plurality of generally cylindrical drip points, a portion of said drip points being positioned along said marginal edge portions to project beyond said marginal edges with the sides of said drip points projecting laterally beyond the surface of said marginal edge portions, the remaining portion of said marginal drip points projecting from said end edge faces in a direction away from said marginal edges, and wherein the body has a hole located therein with the center of said hole lying equidistant from said coplanar marginal edges and equidistant from said end edge faces, a transverse rib extending between said arcuate end edges substantially through said transverse plane and a central rib lying substantially in said central plane said ribs intersecting at said transverse axis to form a cross member across said hole.

2. The saddle defined in claim 1 wherein said transverse rib is one of a plurality of parallel ribs each integral with the surface of the center and lying in a plane parallel to the transverse plane.

3. A saddle for use as a packing or vapor/liquid contacting element in a bed of such elements comprising; a body formed into a shape conforming generally to a surface generated by rotation of an inner half section of a circle through 180° about a central axis, said surface resembling an inner peripheral section of a hollow torus having respective parallel and coplanar marginal edges and respective inner and outer surfaces the parallel marginal edges lying in generally parallel planes relative to a transverse plane including a transverse axis of said body, the coplanar edges lying in a cross-sectional plane including a cross-sectional axis of said body and perpendicular to the transverse plane, a plurality of integral elongated surface protrusions lying on the outer surface adjacent to the parallel marginal edges, each protrusion having a free end extending beyond each of the said parallel marginal edges a selected distance and away from the surface of said parallel marginal edges a selected distance, and a plurality of integral cross-sectional edge protrusions extending from the cross-sectional marginal edges a selected distance in a direction generally perpendicular to the transverse plane of the body, each of said respective surface protrusions and cross-sectional protrusions providing drip points for liquids in contact with the saddle and for separating one saddle from another in the bed such that there can be no pooling of liquids in contact with the saddle and for separating one saddle from another in the bed such that there can be no pooling of liquids regardless of the deposition of elements adjacent one another in the bed and thereby providing a stable surface area and likewise stable pressure drop characteristic per unit volume of elements in the bed, a transverse rib lying substantially in said transverse plane, a central rib integral with the surface of said saddle and lying in a plane including the central axis of the body and perpendicular to both the cross-sectional and transverse planes, and wherein the body has a hole located therein with a center centrally located therein relative to the parallel marginal edges and the coplanar marginal edges, said central rib and said transverse rib intersecting at the center of said hole to form a cross member across said hole.

4. The saddle defined in claim 3 wherein some of said drip points positioned along said marginal edge portions project laterally beyond said marginal edge portion toward said transverse axis, and some of said drip points projecting beyond said marginal edge portions away from said transverse axis, the drip points projecting toward said transverse axis being alternately positioned along said coplanar marginal edges with the drip points which project away from said transverse axis.

5. A saddle for use as a packing or liquid/vapor contacting element in a bed of such elements comprising; a body formed into a shape conforming generally to a surface generated by the rotation through approximately 180° about a central axis of an inner annular half section of a circle, said shape resembling a half section of an inner annular portion of a hollow torus with overall dimensions of length to width of about 2 to 1, the body having parallel marginal edges in parallel planes relative to a plane transverse of the body including a transverse axis of the body and coplanar edges in a cross-sectional plane including a cross-sectional axis of a whole torus, the body having a hole and an integral ribbed edge centrally located with a central axis of the hole lying in the transverse plane, perpendicular to the cross-sectional plane, and equidistant from the parallel and coplanar marginal edges, a first integral rib extending the entire length of the body and lying in the transverse plane across the hole and integral transverse ribs parallel with said first integral rib extending the entire length of the body respectively disposed on either side of said first rib and similarly parallel with the parallel marginal edges, a second integral rib extending diametrically across the hole perpendicular with the aforementioned transverse ribs forming a cross within said hole and integral coplanar cross-sectional ribs extend from the ends of the body generally radially outwardly in the same plane as said cross-sectional edges, the cross-sectional ribs and cross rib being perpendicular to the transverse ribs and having offset radii of curvature; integral protrusions forming drip points extend a selected distance from and lie in parallel planes with the plane of the transverse edges; and integral protrusions forming drip points extend from the cross-sectional edges and are perpendicular to said cross-sectional plane; said drip points being tapered for breaking up fluids in contact therewith, the drip points and ribs separate one body from others in the bed such that there can be substantially no pooling of liquids regardless of the disposition of the elements adjacent one another and further providing a stable surface area and a likewise stable pressure drop per unit volume of packing elements in the bed.

6. A saddle for use as a packing or vapor/liquid contacting element in a bed of such elements comprising; a body formed into a shape conforming generally to a surface generated by rotation of an inner half section of a circle through 180 degrees about a central axis, said surface resembling an inner peripheral section of a hollow torus having respective parallel and coplanar marginal edges and respective adjacent inner and outer surfaces, the parallel marginal edges lying in generally parallel planes relative to a transverse plane including a transverse axis of said body, the coplanar edges lying in a cross-sectional plane including a cross-sectional axis of said body and perpendicular to the transverse plane, a plurality of integral elongated surface protrusions lying on the outer surface adjacent to the parallel marginal edges, each protrusion having a free end extending beyond each of the said parallel marginal edges a selected distance and away from the surface adjacent said parallel marginal edge a selected distance, and a plurality of integral cross-sectional edge protrusions extending from the cross-sectional marginal edges a selected distance in a direction generally perpendicular to the transverse plane of the body, each of said respective surface protrusions and cross-sectional protrusions providing drip points for liquids in contact with the saddle and for separating one saddle from another in the bed such that there can be substantially no pooling of liquids regardless of the deposition of elements adjacent one another in the bed and thereby providing a stable surface area and a likewise stable pressure drop characteristic per unit volume of elements in the bed, a plurality of parallel ribs each integral with a surface of the saddle and lying in a plane parallel with the transverse axis, cross-sectional ribs integral with each of the coplanar marginal edges extending from said coplanar marginal edges in said cross-sectional plane, a central cross-sectional rib integral with the surface of said saddle and lying in a plane including the central axis of the body and perpendicular to both the cross-sectional and transverse planes, and wherein the body has a hole located therein with a center centrally located therein relative to the parallel and cross-sectional marginal edges, a central axis of said hole lying in said transverse plane and perpendicular to the cross-sectional plane, said parallel rib lying in the transverse plane and said central cross-sectional rib forming a cross member across said hole.

* * * * *